Figure 8:
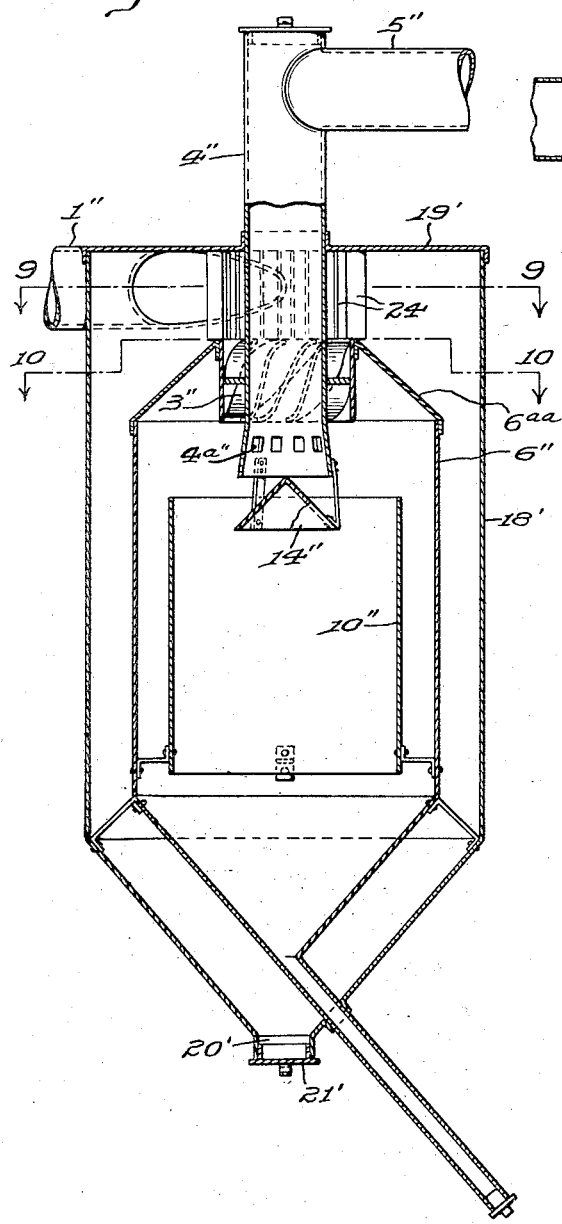

Aug. 6, 1935.   C. H. HEIST   2,010,231
CLEANER FOR GASEOUS FLUIDS
Filed Jan. 20, 1932   3 Sheets-Sheet 1
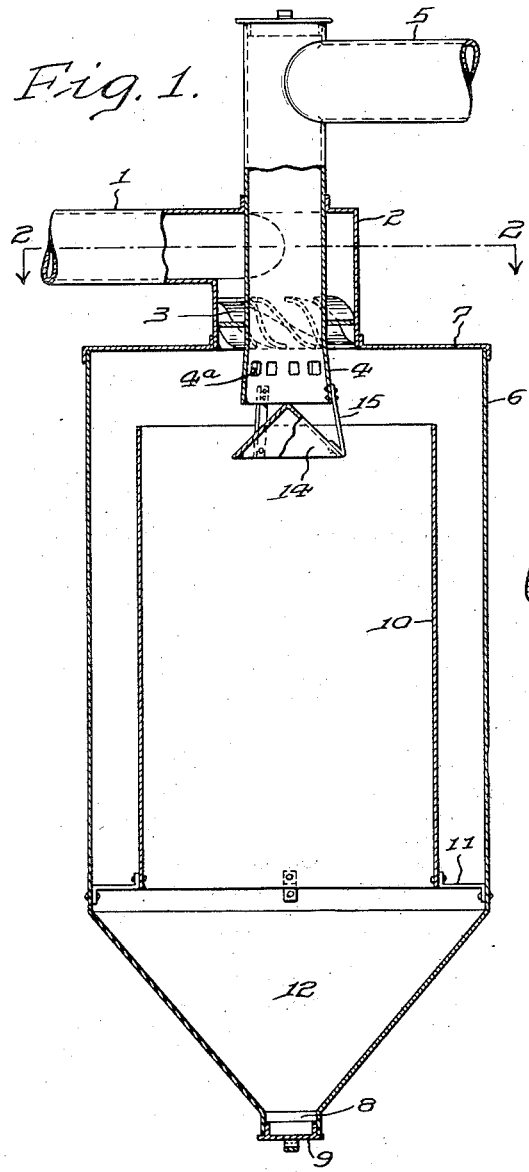
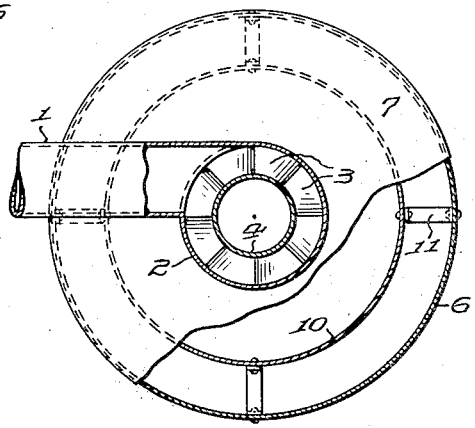
INVENTOR
Charles H. Heist.
BY
ATTORNEYS
WITNESS Aug. 6, 1935.　　　　C. H. HEIST　　　　2,010,231
CLEANER FOR GASEOUS FLUIDS
Filed Jan. 20, 1932　　　3 Sheets-Sheet 2
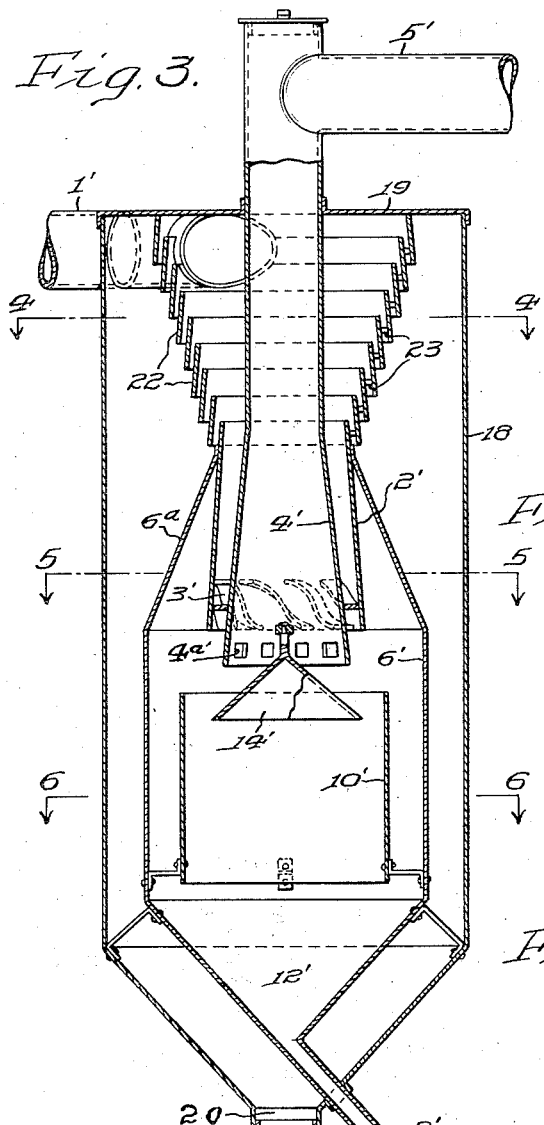
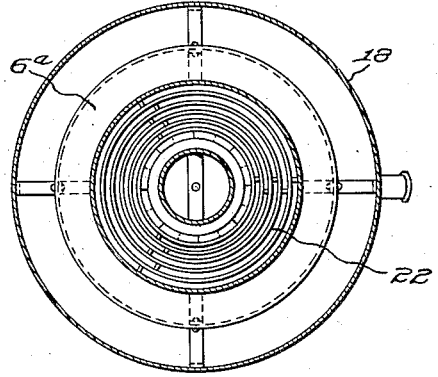
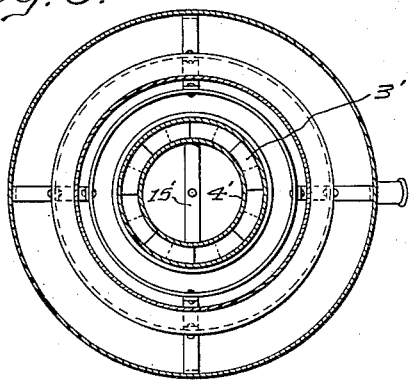
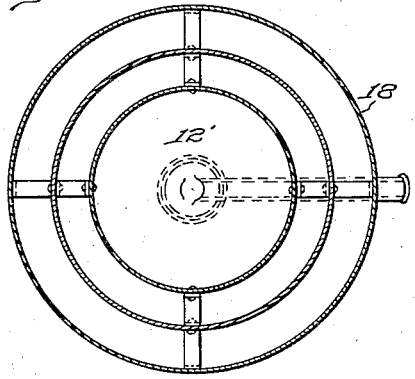
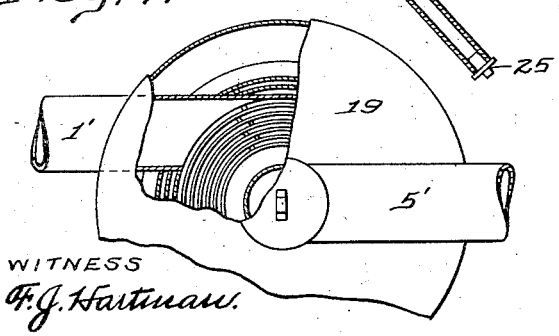
INVENTOR
Charles H. Heist.
BY
ATTORNEYS
WITNESS
F. J. Hartman.

Aug. 6, 1935.   C. H. HEIST   2,010,231
CLEANER FOR GASEOUS FLUIDS
Filed Jan. 20, 1932   3 Sheets-Sheet 3

INVENTOR
Charles H. Heist.
BY
ATTORNEYS

WITNESS

Patented Aug. 6, 1935

2,010,231

UNITED STATES PATENT OFFICE 2,010,231

CLEANER FOR GASEOUS FLUIDS

Charles H. Heist, Youngstown, Ohio

Application January 20, 1932, Serial No. 587,622

10 Claims. (Cl. 183—84)

This invention relates to an improved cleaner for gaseous fluids and in certain of its forms is particularly adapted for operative association with blast furnaces to take the place of the dust catchers and/or the secondary gas cleaners generally utilized in connection therewith, my improved cleaner being effective when so employed to remove substantially all of the entrained solids from the stream of exhaust gases emitted from the furnace. It will be understood, however, that gas cleaners substantially similar in structural detail to those adapted to be employed for the purposes referred to and embodying the principles of my invention may also be utilized to advantage in association with other apparatus, and thus, by suitably proportioning the size of the gas cleaner to the quantity of gaseous fluid required to be cleaned, my invention may desirably be employed for cleaning air which is to be supplied, for example, to internal combustion motors and the like to prevent the passage thereinto through the carburetor of entrained solids and other foreign matter ordinarily in suspension in atmospheric air, or for various other purposes such as will readily suggest themselves to those familiar with industrial applications of gas and/or air cleaners.

A principal object of my invention, therefore, is to provide an improved cleaner for gaseous fluids, hereinafter for convenience referred to as "gas", adapted for interposition in a conduit or other passage to extract entrained solids or other foreign matter from gas flowing therethrough substantially continuously but without offering material resistance to the passage of the gas whereby the latter is delivered to the outlet conduit leading from the cleaner substantially freed of such entrained material.

A further object of my invention is to provide a gas cleaner of the character described which is of simple construction, being desirably made from sheet iron or like material, which is substantially devoid of moving parts, and which is continuously useful for the performance of its intended functions throughout relatively long periods of time without substantial attention or the expenditure of power for its operation.

A still further object of the invention is to provide a gas cleaner in which the solid material is collected in a chamber relatively isolated from the zone of rapid flow of the gas from which it is extracted, whereby such material may periodically be removed from the cleaner substantially without affecting its operative efficiency or necessarily requiring that the passage of gas therethrough be discontinued during the removal of the material.

A still further object of the invention is to provide a gas cleaner comprising means for effecting relatively rapid movement of dust laden and otherwise impure gas in a circular and/or spiral path, whereby centrifugal force acting on the dust and other entrained particles effectively brings about their initial collection in a zone adjacent the outer walls of the cleaner while the gas itself is withdrawn therefrom through a passage disposed substantially centrally thereof, and therefore removed from the zone occupied by relatively large amounts of dust and other particles of said matter which latter are subsequently precipitated to the bottom of the cleaner, from which they may be removed from time to time as occasion requires.

Another object of my invention is to provide a gas cleaner which may be suitably proportioned for operative association with any specific apparatus to which it is desired to feed a moving stream of gas or air freed or substantially freed of entrained solids and other foreign matter, the cleaner being of such design and construction as to be effective for its intended function irrespective of its size, provided, of course, that its capacity be suitably proportioned to the magnitude of the stream of gaseous fluid intended to be cleaned thereby.

Other objects, purposes and advantages of the invention will hereinafter more fully appear or be understood from the following description of certain embodiments thereof in which reference will be had to the accompanying drawings.

Figure 9:
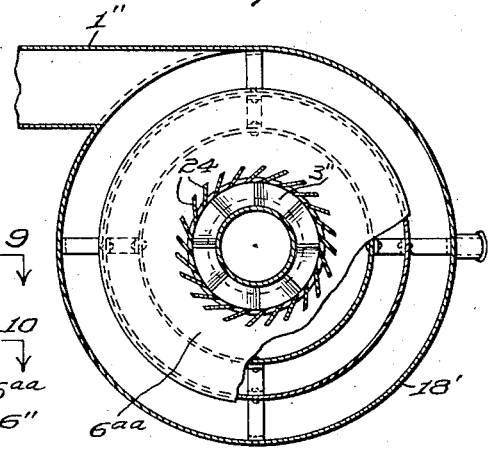
Figure 10:
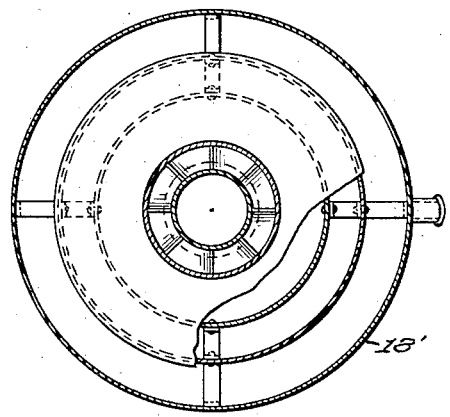

In the said drawings, Fig. 1 is a central vertical section of one of said embodiments, which will usually be preferred, in association with conduits respectively adapted for the passage of gas into and from the cleaner, and Fig. 2 is a horizontal section thereof on the lines 2—2 of Fig. 1 with certain parts broken away to show internal construction. Fig. 3 is a view corresponding to Fig. 1 but showing another embodiment of the invention of somewhat more complicated nature but which may, however, be deemed preferable for certain uses; Fig. 4 is a horizontal section thereof on the lines 4—4 in Fig. 3; Figs. 5 and 6 are similar sections on the lines 5—5 and 6—6 respectively in Fig. 3, and Fig. 7 is a top plan view, with certain parts broken away, of the apparatus shown in the four preceding figures; Fig. 8 is a section corresponding to Figs. 1 and 3 showing still another embodiment of my invention; Fig. 9 is a horizontal section thereof on the lines 9—9 in Fig. 8, and Fig. 10 is a similar section on the lines 10—10 in Fig. 8. In the several figures, like characters are used to designate the same elements with corresponding parts distinguished by superscriptions.

Referring now more particularly to the drawings, it will be understood that the gas supply pipe represents any conduit or passage through which the gas to be cleaned may be delivered to the gas cleaner. In the preferred embodiment of my invention shown in Figs. 1 and 2, the supply pipe 1 is connected to the interior of a substantially cylindrical cap 2 in a generally tangential direction so that as the gas is delivered from the pipe 1 it is deflected by the outer wall of the cap and given a rotary motion within the cap in a clockwise direction as viewed in Fig. 2. In the lower portion of the cap 2 are provided a plurality of helically arranged, downwardly inclined fins 3 which preferably extend inwardly from the walls of the cap 2 to the outer surface of an exhaust pipe 4 extending substantially axially of the cap 2 and projecting beyond its upper extremity for interconnection with an exhaust conduit 5 through which the cleaned gas is delivered to the apparatus provided for receiving it. Disposed below the cap 2 and arranged coaxially therewith is a cylindrical casing 6 providing an enlarged cylindrical chamber within its walls and having a top 7 which extends from the lower edge of the cap 2 to the upper edge of the casing substantially normal to the axis thereof and forms effective gas tight seals at the junctions with said parts. The lower end of the casing 6 is desirably reduced to conical form as shown in Fig. 1 and provided with a suitable clean-out opening 8 at the bottom of the conical portion, which is operatively closed by a removable plug 9 or other suitable means.

Within the casing 6 is disposed a substantially cylindrical shield or baffle 10 of less diameter than the casing and supported centrally thereof on brackets 11 at its lower end or in any other suitable way, so that an annular space is formed adjacent the outer walls of the casing through which the larger particles of solid matter may descend into the cone-shaped receiving zone or sump 12 at the bottom of the casing without being brought into contact with the stream of moving gas as hereinafter described. The lower end portion of the exhaust pipe 4 desirably projected a short distance below the top 7 and provided with a plurality of spaced ports 4a through which some gas is admitted into the exhaust stream, the main body of which passes into the pipe 4 through its open lower end, while at a suitable distance below the end of the pipe a substantially conical bell 14 is disposed and supported in any preferred way, conveniently by spaced straps 15 depending from the edge of the pipe. It will, of course, be understood that the ports 4a may be of any desired or suitable size and configuration, being represented in the drawings as rectangular for convenience of illustration.

In operation, the initial rotative motion of the gas in the upper portion of the cap 2 is enhanced by the helical inclination of the fins 3 as the gas passes downwardly therebetween, so that upon issuing into the enlarged chamber provided by the casing 6 the gas is rotating fairly rapidly. However, as the gas emerges into this chamber its velocity is appreciably decreased, while the heavier solid particles contained in the gas are thrown outwardly by centrifugal force against the walls of the casing and thereafter fall toward the bottom thereof through the annular space between the casing and the shield 10, the decrease in velocity of the gas also enhancing the deposition of the particles and preventing them from being maintained in suspension in opposition to the centrifugal force acting upon them. Thus, the particles during their descent into the sump 12 at the bottom of the casing are prevented from again coming into contact with the moving stream of gas, the direction of movement of which is now reversed from the spirally outward flow produced by the fins 3 to a spirally inward flow, resulting from the centripetal attraction of the relatively reduced pressure zone within the pipe 4 as the gas passes thereinto, the presence of the conical bell below the pipe also tending to again change its direction somewhat just as it enters the latter, and to prevent material agitation of the solid particles collected in the sump 12 by the movement of the gas in the upper part of the casing. Moreover, the conical shape of the bell permits any solid particles which may be deposited thereon to fall by gravity into the conical portion of the casing, thus preventing any clogging of the pipe 4 through which the gas is withdrawn, while the small quantity of gas drawn from the zone closely adjacent the exterior of the pipe through the ports 4a, and which is relatively clean since most if not all of the foreign matter which it initially contained has been previously thrown outwardly, serves to decrease the velocity of the main stream passing upwardly into and through the pipe sufficiently to prevent the gas being drawn from the body of the cleaner before the entrained particles have had an opportunity to settle therein.

It will thus be appreciated that in its passage through my improved gas cleaner, the gas is first given a swirling or rotating direction of flow and is then introduced into an enlarged chamber in which its velocity is materially decreased. As the inertia of the entrained solids is considerably greater than that of the gas, the centrifugal force resulting from the rotative action effectually removes substantially all such particles from the gas and the latter therefore passes into the space enclosed by the cylindrical shield or baffle 10 in a substantially clean condition, while owing to its now relatively low velocity, any of the particles which may still be retained in the gas stream precipitate therefrom and descend into the zone 12 of the gas cleaner through the shield 10 before the gas is withdrawn through the pipe 4. The zone 12 is desirably so formed as to have relatively large volumetric capacity and thus requires only relatively infrequent attention to remove the collected solids to prevent possible clogging of the apparatus from the presence therein of excessive amounts thereof. When requisite or desirable, however, these may be readily removed for proper disposal by withdrawing the plug 9 and allowing them to fall through the opening 8 by gravity into any suitable receptacle.

The gas cleaner shown in Figs. 3 to 7, inclusive, is of somewhat more elaborate nature but embodies the principles as just described, the tubular preferably slightly upwardly tapering conduit 2' corresponding in function and operation to the cap 2 in Fig. 1 and other parts likewise corresponding as will hereinafter appear. In this form of the invention, however, an outer casing 18, provided with a top 19 and having its conical lower end terminating in a clean-out opening 20 closed by a plug 21, forms an outer chamber into the upper end of which the gas supply pipe 1' discharges, the pipe opening substantially tangentially within the interior of a generally conical space defined by a plurality of overlapping concentric conical rings or baffles 22 which are maintained in spaced relation by lugs 23 or other suitable means. These rings are of progressively decreasing diameter, the largest ring being at the top and the smallest at the bottom, and form a stepped inverted generally conical chamber communicating at its lower end with the conduit 2', which is provided adjacent its lower end with fins 3' which are helically disposed in the space between the conduit 2' and the exhaust pipe 4' leading upwardly within it, the exhaust pipe being provided with velocity-decreasing ports 4a' generally similar to ports 4a and for a like purpose, while a casing 6' substantially encloses the conduit 2' and supports an inner cylindrical shield 10' generally corresponding to the shield 10 shown in Fig. 1. The conical lower end of the casing 6' forming the sump 12' is provided with an outlet pipe 8' which extends downwardly and outwardly through the wall of the casing 18 to permit removal of collected solids from within the casing 6'. In the drawings, a bell 14' is shown supported from its apex on a cross bar 15' carried by the exhaust pipe 4', but it will be understood that the bell may be supported from straps in a manner similar to that employed in the preferred embodiment of the invention if desired.

In the operation of this form of the invention, the gas is delivered tangentially against the ring baffles 22 which interrupt the movement of the larger particles entrained in the gas and cause them to fall, through the spaces between adjacent baffles, into the outer part of the casing 18, while the gas itself, including the finer particles entrained therein, passes downwardly through the conduit 2' and between the fins 3' where further swirling action is induced before the velocity of the gas is suddenly decreased upon its issuance into the chamber enclosed by the casing 6'. As the features of the invention embodied in the apparatus enclosed within the casing 6' are substantially the same as those employed in the preferred embodiment of the invention already described, it is believed no further description thereof is necessary and that it will be apparent the cleaned gas is delivered through the pipe 4' into the pipe 5' leading to the apparatus provided for receiving it, while the larger particles which have been extracted therefrom may be removed from the casing 18 through the opening 20 by withdrawal of the plug 21 and the finer particles removed from the casing 6', when desired, through the pipe 8' which is normally closed by a suitable valve or plug 25. It should be noted, however, that the top 6a of the casing 6' is preferably tapered upwardly and inwardly from the body of the casing to meet the upper part of the conduit 2', thus providing a steeply inclined surface upon which the heavier particles falling from between the ring baffles may slide toward the receiving zone or sump in the lower end of the outer casing 18.

The form of my invention shown in Figs. 8 to 10, inclusive, is likewise desirably provided with an outer casing 18' generally similar to the casing 18 employed in the form just described and having a top 19' and reduced conical lower end provided with a clean-out opening 20' closed by a removable plug 21'. The intake pipe 1'' opens directly into the outer casing tangentially thereof as clearly shown in Fig. 9, and the larger particles entrained in the gas are thrown against the walls of the casing by centrifugal force as a rotative motion is imparted to the gas stream, the particles then falling to the bottom of the casing where they are collected for subsequent removal through the opening 20'. The outlet pipe 4'' extends vertically and centrally through the top 19' and is surrounded in the plane of the intake pipe 1'' by a plurality of angularly disposed vertical vanes or baffles 24 which are spaced outwardly from the pipe 4'' a sufficient distance to provide an annular passage through which the gas, after passing between the vanes, may descend spirally downwardly and into the casing 6'' through the helical fins 3'' located below the vanes. The construction of the gas cleaner now being described is substantially similar insofar as the parts disposed within the casing 6'' are concerned to the embodiment of the invention shown in Figs. 3 to 7, inclusive, and it will thus be apparent that when the gas is introduced into the casing 18' it is initially directed in a rotative path in a clockwise direction looking downwardly from the top, and that this direction is reversed to counterclockwise after the larger particles are thrown toward the outer surface of the casing 18' by the passage of the gas through the spaces between the vanes 24. The gas thereafter continues in this counterclockwise direction downwardly between the fins 3'' and into the casing 6'' where additional particles entrained in the gas are deposited, the gas then passing into the shield 10'' and thence over the bell 14'' into the exhaust pipe 4'' and the conduit 5'' at relatively low velocity, the ports 4a'' here also serving to relieve to some extent the relatively reduced pressure at the mouth of the pipe 4'' and thereby prevent too rapid passage of the gases thereinto. It may here be noted that the top 6aa of the casing 6'' is preferably conical in shape, and thus prevents the lodgment of particles of dust or other matter thereon similarly to the top 6a heretofore described, so that possible clogging of the gas cleaner or impairment of its operative efficiency is prevented, while substantially all of the solids removed from the gas are deposited in the zones or sumps designed to receive them and from which they may be removed from time to time as occasion requires.

As hitherto pointed out, the size and capacity of a gas cleaner embodying the principles of my invention will of course in a large measure be dictated by the requirements of the apparatus in connection with which it is to be used, and the cleaners will therefore vary greatly in this respect in accordance with the particular purposes or installations for which they may be designed.

Furthermore, while I have herein described and illustrated certain forms of my invention with considerable particularity, I do not thereby desire or intend to restrict myself specifically thereto as changes and modifications in the design, construction and arrangement of the various elements will readily occur to those skilled in the art and may be made if desired, without departing from the spirit and scope of the invention as defined in the appended claims.

Having thus described my invention, I claim and desire to protect by Letters Patent of the United States:

1. A gas cleaner comprising an operatively closed casing, means for directing the gas to be cleaned thereinto, said means being of relatively small diameter with respect to the casing and extending axially thereof, a plurality of helical fins coaxial with the casing interposed in said means in the path of the gas and effective to impart spiral movement thereto prior to its entrance into the casing to thereby effect in the casing centrifugal separation of solid particles from the gas, a hollow cylindrical shield disposed within said casing, spaced from the walls thereof and terminating short of the inlet end of the casing, and an outlet pipe coaxial with the casing adapted to conduct cleaned gas upwardly from the interior thereof.

2. A gas cleaner comprising a substantially cylindrical casing, an inlet pipe through which the gas to be cleaned is supplied to the casing, means, extending coaxially into and of relatively small diameter with respect to the casing, interposed between the inlet pipe and the interior of the casing operative to impart to the stream of gas a swirling movement prior to its entry into the casing whereby particles of matter entrained in the gas are thrown outwardly from the main gas stream toward the wall of the casing after passage of the gas thereinto, means within and spaced from the upper end of the casing defining an annular chamber adjacent its wall for reception of said particles, means adjacent the lower end of the casing operable to permit withdrawal of said particles when accumulated at the bottom thereof, an exhaust pipe extending axially from the top of the casing and forming an exit passage for the cleaned gas from its interior, and means associated with the lower end of the pipe for effecting a directional change in the flow of the gas just prior to its entry thereto.

3. A gas cleaner comprising a cylindrical casing of relatively large diameter, means operative to direct into the upper part of the casing a stream of gas to be cleaned, the diameter of said stream upon its entry into the casing being relatively small in comparison with the diameter of the interior of the casing, means interposed in the path of said stream for imparting a swirling motion thereto before the gas passes into the casing whereby entrained particles are thrown tangentially outward from the gas stream on entry into the casing, an exhaust pipe leading axially from the top of the casing and through said means, means disposed within the casing defining an annular chamber adjacent the wall thereof, and means adjacent the lower end of the exhaust pipe adapted to effect a directional change in the flow of the gas as it passes thereinto from the casing.

4. A gas cleaner comprising a cylindrical casing, means coaxial therewith disposed adjacent the top of the casing forming a passage for the gas to be cleaned, an inlet pipe communicating with said means for directing the gas tangentially thereinto, said passage being of materially less diameter than the interior of the casing, means interposed in said passage for imparting to the gas stream a swirling motion prior to its entry into the casing, an exhaust pipe coaxial with the casing having its lower end terminating below said means, extending upwardly therethrough, and forming a passage for the exit of the gases from the casing, means associated with the end of the pipe for changing the direction of flow of the gas prior to entry thereto, and a cylindrical shield disposed in the casing below the exhaust pipe and spaced from the wall of the casing.

5. A gas cleaner comprising an outer operatively closed casing, an inlet pipe extending tangentially from the upper part thereof, a series of graduated annular baffles extending downwardly within the casing from the plane of said pipe and respectively spaced apart to provide openings between their adjacent surfaces, a conduit extending downwardly from said baffles and communicating therewith, means adjacent the lower end of said conduit for imparting to the stream of gas passing therethrough a rotary motion, another casing of relatively greater diameter than said conduit surrounding the latter and forming an enlarged chamber for the gas received therefrom, and an exhaust pipe extending upwardly through said conduit and forming a passage for the exit of gas from the cleaner.

6. A gas cleaner comprising an outer casing, an inlet pipe extending tangentially from the upper part thereof, a series of superposed conical baffle rings of respectively decreasing diameter extending downwardly in the casing from the plane of the inlet pipe and providing annular openings between the adjacent surfaces of adjacent rings, a conduit extending downwardly from the lowermost ring and forming a gas passage, means adjacent the lower end of said conduit for imparting to a stream of gas passing therethrough a swirling motion, an inner casing of relatively greater diameter than said conduit receiving the lower end of the latter, an exhaust pipe extending axially upward from a point below and thence through the conduit to afford a passage for the gas from the inner casing, and means within the latter for effecting a directional change in the flow of the gas just prior to its passage into the exhaust pipe.

7. A gas cleaner comprising an outer operatively closed casing, an inlet pipe extending tangentially into the upper part thereof, a plurality of spaced baffles extending downwardly within the casing from the plane of said pipe and providing openings between their adjacent surfaces, a conduit coaxial with the casing adapted to conduct the gas downwardly from the space within said baffles, means in the conduit for imparting to said gas a rotary motion, another casing within said first mentioned casing of greater diameter than the conduit, surrounding the latter and forming an enlarged chamber adapted to receive the gas and entrained particles therefrom whereby the rotative velocity of the gas is substantially reduced and entrained particles are thrown substantially tangentially outward from the gas stream without a corresponding reduction of velocity, and an exhaust pipe extending upwardly within said conduit and forming a passage for the exit of gas from the cleaner.

8. A gas cleaner comprising an outer casing, an inner casing, an inlet pipe adapted to direct a stream of gas tangentially into the upper part of the outer casing whereby an initial rotary motion is imparted to said stream, means interposed in the path of said stream for thereafter imparting thereto rotary motion in the opposite direction, other means disposed below said means for enhancing said rotary motion and thereafter effecting the entry of the gas into the inner casing, and an exhaust pipe leading axially from the inner casing and having its lower end disposed below the last mentioned means.

9. A gas cleaner comprising an outer casing, an inner casing, an inlet pipe adapted to direct a stream of gas tangentially into the upper part of the outer casing whereby an initial rotary motion is imparted to said stream, means interposed in the path of said stream for thereafter imparting thereto rotary motion in the opposite direction, other means disposed below said means for enhancing said rotary motion and thereafter effecting the entry of the gas into the inner casing, an exhaust pipe leading axially from the inner casing and having its lower end disposed below the last mentioned means, and means for effecting a directional change in the movement of the gas just prior to its entry into the exhaust pipe in its passage from the cleaner.

10. A gas cleaner comprising an outer cylindrical casing, an inner cylindrical casing, an inlet pipe adapted to direct a stream of gas tangentially into the upper part of the outer casing, means for directing gas therefrom into the inner casing, a plurality of vertically disposed spaced vanes interposed in the path of said stream leading to the inner casing, a plurality of helically disposed fins located below said vanes and also in said path, and an exhaust pipe extending vertically from and coaxially with said inner casing within said means, the lower end of the pipe being disposed in the casing below said fins, and the latter and said vanes being disposed about the pipe.

CHARLES H. HEIST.